3,143,910
**ROTATING SHEARS FOR CUTTING CONTINU-
OUSLY MOVING ROLLED MATERIAL**
Karl Greis, St. Ingbert, Saar, Germany, assignor to
Moeller & Neumann, St. Ingbert, Saar, Germany
Filed Apr. 11, 1963, Ser. No. 272,432
Claims priority, application Germany Apr. 12, 1962
4 Claims. (Cl. 83—311)

The present invention relates to rotating shears for cutting continuously moving rolled material in which the speed of the drums carrying the cutting knives are infinitely adjustable and wherein the stroke of the rocker arms supporting the knife drums may be varied to correspond with a change in the effective cutting circle of the knives.

According to the invention the continuously rotating rolled material may be cut by means of rotating shears in a wide range and into varying lengths depending on the particular requirement.

This is generally possible within a narrow range by changing the peripheral speed of the knives, but this method is limited in the case where the difference between the peripheral speed or the speed of the knife during the cutting operation and that of the rolled material being cut reaches the point at which the unavoidable jolts against the shears become too hard and the forward end of the rolled material becomes upset or bent, for example, when the shears rotate too slowly.

With the use of continuously rotating shears which, in comparison to shears which are started from a stationary condition, are much simpler to control and which are used exclusively with high rolling speeds, various ways have been tried in order to obtain a similar amount of play in the possible cutting lengths. A shears construction is known in which the cutting diameter may be varied by means of radially adjustable knife supports. The rotary speed of the two knife supports is infinitely variable while remaining equal relative to each other. The knife support shafts are adjustable in their relative distance to correspond with the change in diameter of the cutting circle. If a larger cutting circle is set a longer knife path is produced per revolution of the knife support and thus a greater cutting length is provided with a constant speed of the rolled material, if simultaneously and of necessity the larger peripheral speed of the knives is brought back to the particular speed of the rolled material by means of an adjustment of the speed of rotation. This known principle permits only a cutting into varying lengths within the range of a ratio of possible construction between a maximum and a minimum adjustable cutting circle of the knives.

Another prior art shears construction provides knife drums which are carried in rocker arms and mounted at a distance from the shearing axis and which are driven in the last gear stage at the same speed by means of gears which are mounted on the same shaft as the drums and gears which are associated with the shafts of the rocking arms. The cuts are carried out in that the rocker arms are slowly brought closer to each other through an adjustable number of rotations. The drive for the symmetrical movement of the rocker arms is derived from the drive for the shears. The adjustable number of ineffective rotations of the knife drums between the cuts is determined by a differential drive through which at intervals a rotary cotter pin coupling is connected and disconnected in order to carry out a single rocking movement of the rocker arms which carry the knife drums.

One disadvantage of the above described shears resides in the fact that they provide generally only cutting lengths which are a double or a multiple of the periphery of the cutting circle. At a constant speed of the rolled material the number of rotations of the drum could be changed in order to decrease the gap between the possible cutting lengths, but this expediency is again limited by the jolts against the shears and the upsetting or bending of the ends of the material being cut. At the most a difference of 25% between the knife speed and the speed of the rolled material is considered permissible in this respect. A substantially infinite adjustment of the cutting length is thus not possible with this prior art shears construction.

It is therefore an object of the invention to provide full motion rotating shears for cutting continuously moving rolled material and by means of which infinitely variable cutting lengths may be set within a wide cutting range.

The present invention is an improvement of the above described prior art shears construction having knife drums mounted in movable rocker arms and the knives being radially adjustable in the knife drums in a known manner, and consists in that the number of revolutions of the drums are infinitely variable and that the stroke of the rocker arms is adjustable to correspond to any adjustment of the diameter of the knife circle.

In the rotating rocking shears of the present invention the adjustability of the knives together with the variable change of the number of revolutions of the drum make it possible to cut the lengths between the cutting lengths determined by the double of or multiple of the knife periphery in an infinitely variable and completely jolt free manner because when the diameter of the knife circle is increased, for example, the number of revolutions of the drum must be reduced when the speed of the rolled goods remains constant in order to return the increased peripheral speed of the knives to the corresponding speed of the rolled material. In this case the knives require more time per revolution during which a greater length of the rolled material than before has passed the cutting point.

The variation of the stroke of the rocker arms assures that the knives produce a cut having the desired overlap with anyone of the possible knife circle diameters. In the case where an auxiliary crank shaft is employed to drive the rocker arms in a known manner, which shaft acts on the rocker arms through two oppositely movable connecting rods, the stroke variation is obtained suitably in that the effective length of the connecting rod is made adjustable.

The drive for the rocker arms may be provided as in the prior art related shears construction by connecting a coupling after one or more revolutions of the knife drums, but according to the invention the jolt-like action of the prior art arrangement in driving the rocker arms is eliminated. Accordingly, the rocker arms are operated over a driving mechanism which is taken from the drive which operates the shears and whose gears are adjusted to full number transmission ratios between the number of revolutions of the drum and the number of revolutions of the auxiliary crank shaft. With this arrangement the rocker arm drive is full cycle although the size of the transmission ratio, i.e., of the maximum number of revolutions of the knife drums per oscillating cycle of the rocker arms is limited in the sense that during a revolution directly before or after a cut when the rocker arms are relatively close to each other, the knives must not make contact with the continuously rolled material.

These and other features and advantages of the invention will appear from the following detailed description of an embodiment of the invention taken in conjunction with the accompanying drawing in which.

Figure 1:
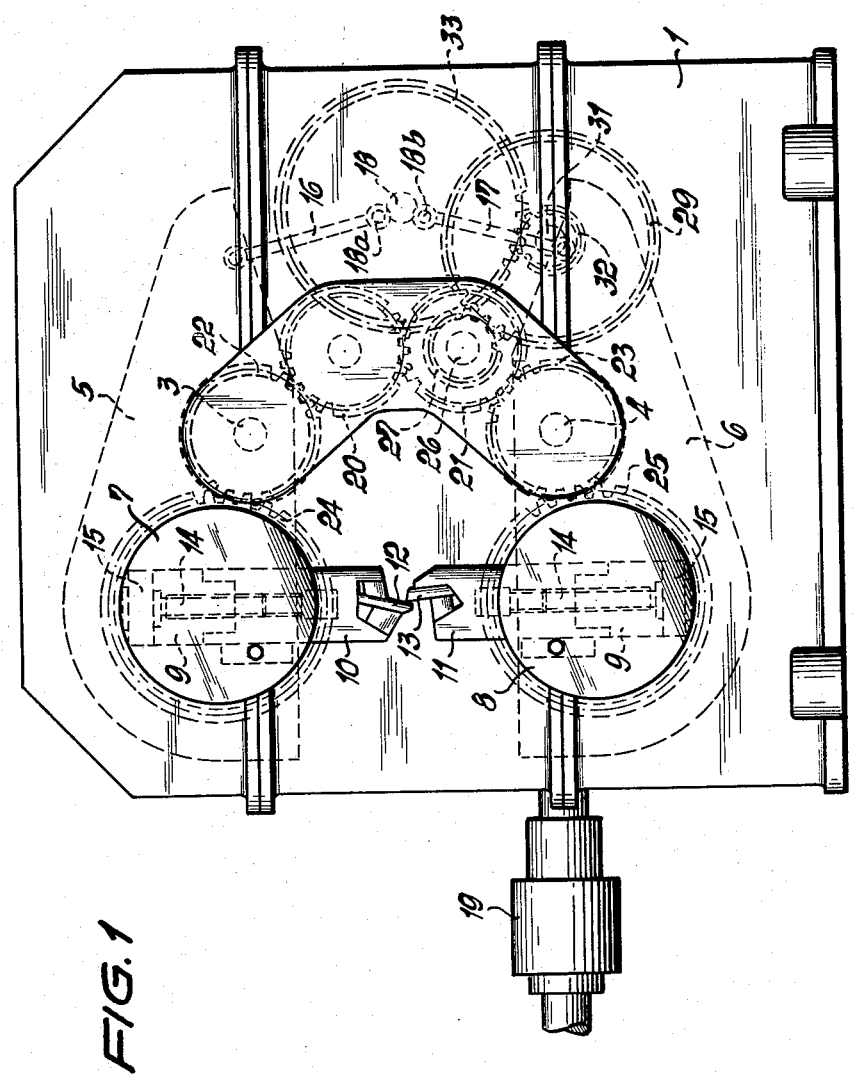
FIG. 1 is a side elevation view of the shears according to the invention showing the end face of the knife drums.

Referring now to FIG. 1 of the drawing, numeral 1 designates the housing for the shears in which two oppositely movable rocker arms 5 and 6 are mounted on support shafts 3 and 4. The rocker arms carry shafts which support knife drums 7 and 8 mounted freely rotatable at their outer ends. The knife drums have radial slots 9 which receive knife carriers 10 and 11 provided with knives 12 and 13 respectively at their outer ends. The knife carriers are radially adjustable relative to the knife drums by means of spindles 14 connected to the knife carriers so that the knives may be adjusted to various knife circle diameters. The spindles 14 are maintained stationary by means of collars 15 so that a rotation of the spindles in the threaded engagement between the spindles and the knife carriers produces a displacement of the knife carriers.

To the rear of shafts 3 and 4 the rocker arms 5 and 6 are connected through connecting rods 16 and 17 to an auxiliary crank shaft 18 provided with two crank portions 18a and 18b. This auxiliary crank shaft and the associated connecting rods provide the drive for the oppositely moving rocker arms 5 and 6.

Figure 2:
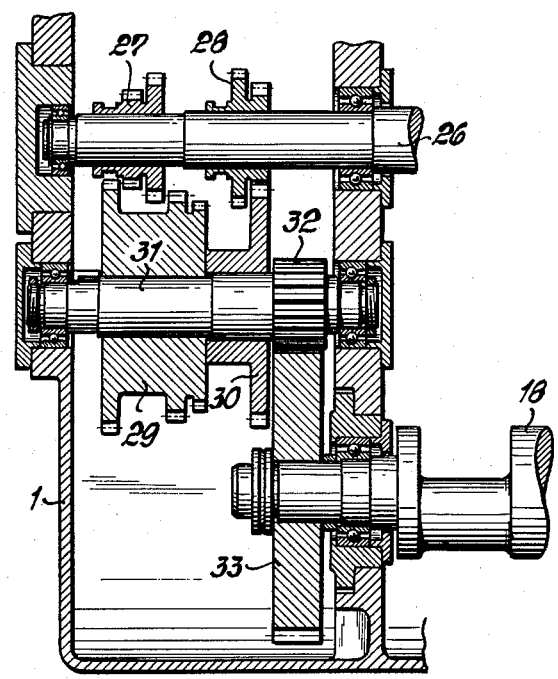
FIG. 2 is a section through a drive for setting different transmission ratios between the speed of rotation of the drums and the auxiliary crank shaft and FIG. 3 shows a connecting rod and the associated arrangement, partly in section, for reducing its effective length to alter the stroke of the rocker arms.

The setting of the different full number transmission ratios between the number of revolutions of the knife drums 7 and 8 on the one hand, and the number of revolutions of the auxiliary crank shaft 18 is provided by a driving arrangement illustrated in FIG. 2. This drive is taken from a shaft 26 which is also illustrated in FIG. 1. On this shaft 26 two gears 27 and 28 are mounted slidably. These gears may be coupled selectively to four different toothed rims of the gears 29 and 30 on a transmission shaft 31 mounted for rotation in housing 1. Shaft 31 carries also a pinion 32 which is constantly in mesh with a large gear wheel 33 mounted on crank shaft 18. The transmission ratios are so determined that in view of the transmission ratios between the gears 20 or 21, 22 or 23 and 24 or 25 the transmission ratio of 1 to 2, 1 to 3, 1 to 4, 1 to 5 may be set between the shafts of the knife drums 7 and 8 at the auxiliary crank shaft 18. In the present embodiment no provision is made for the case where the knives are intended to produce a cut during each revolution of the knife drum, which would correspond to a transmission ratio of 1 to 1. By a locking device (not shown) the connecting rods may be secured in such a manner that the connecting gears are actuated only when the auxiliary crank shaft 18 is in a predetermined position whereby a definite setting of the angular positions of the knife drums and the auxiliary crank shaft is maintained. The position of the shafts 26, 31 and 18 and the associated gears as illustrated in FIG. 2 is represented in FIG. 1 for one transmission or multiplication.

The numbers of revolution of knife drums 7 and 8 may be varied infinitely by using a direct current motor or a stepless control drive in front of coupling 19 and so designed that it fulfills the requirements of adjustability of the knife carriers 10 and 11 in view of the possible variations of the feeding speeds of the rolled material.

Figure 3:
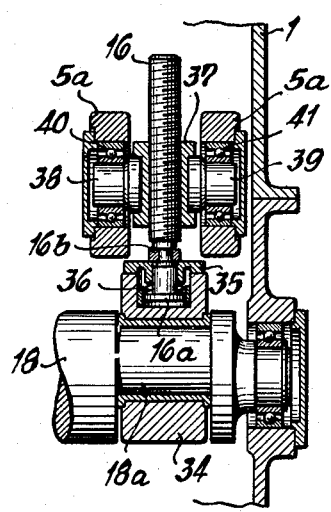

In FIG. 3 of the drawing the connecting rods 16 and 17 are shown in engagement with an associated device for adjusting the effective length of the connecting rods. The connecting rod 16 shown in the drawing is provided as a spindle and is connected through a connecting rod bearing 34 to a crank journal 18a of the crank shaft 18. In order to eliminate any play a compression spring 36 is inserted between the collar end 16a of the connecting rod and a cover 35, the spring 36 urging the collar end portion 16a against the adjacent surface of the connecting rod bearing 34. The connecting rod 16, which is received in a nut 37, may be turned by means of a hexagonal bar 16b. Upon turning of the connecting rod, the nut 37 is displaced relative to the crank shaft 18. The nut carries two bearing pins 38 and 39 mounted in roller bearings 40 and 41 respectively which are received in bores of the fork like ends 5a of the rocker arms 5 illustrated in FIG. 3. It is thus understood that the rocker arm 5 will move in accordance with the setting of nut 37 whereby a change in the effective length of the connecting rod 16 and thus a stroke variation of rocker arm 5 is produced. This is necessary in order to assure a proper contact of the knife during the cutting operation after the diameter of the knife circle has been changed.

What is claimed is:

1. In metal shears having rotating shear knives the combination of a housing, support means oppositely mounted in said housing for swinging movement relative to each other, knife means rotatably mounted on said support means and adjustable in length to provide varying cutting circles during rotation of said knife means, first drive means for rotating said knife means at a continuous adjustable speed, second drive means connected to said first drive means for moving said support means, said second drive means including connecting means secured to said support means and adapted to vary the stroke of said support means in reference to variations in the length of said rotatable knife means.

2. In metal shears having rotating shear knives, the combination of a housing, a pair of support arms mounted on pivot means in said housing and movable relative to each other, knife drums rotatably mounted in said support arms, knife carrier means secured to said knife drums for radial adjustment to provide varying cutting circles during rotation of said knife drums, a first gear drive for driving said knife drums at a continuous, adjustable speed of rotation, said gear drive including first gear means drivingly mounted in said housing, second gear means coupled to said first gear means and mounted coaxially of said pivot means, and third gear means coupled to said second gear means and adapted to drive said knife drums, a second gear drive connected to said first gear drive, a crank shaft driven by said second gear drive, connecting rod means for operatively connecting said crank shaft to said support arms, and means on said support arms for adjustably engaging said connecting rod means to vary the effective length of said connecting rod means and adjust the stroke of said support means.

3. In metal shears having rotating shear knives, the combination of a housing, shaft means fixed in said housing, a pair of rocker arms mounted on said shaft means and adapted to pivot relative to each other, knife support drums rotatably mounted on said rocker arms, a knife support shaft adjustably secured to said knife drums to vary the radial length of said knife support shaft and change the cutting circle of the knives, a first gear drive for driving said knife drums at a continuous, adjustable speed of rotation, said first gear drive comprising a pair of adjacent gear wheels mounted for rotation in said housing, gear wheels mounted coaxially of said shaft means and coupled each to one of said pair of gear wheels, and gear wheels mounted coaxially of said knife support drums and coupled to said last named gear wheels, a second gear drive connected to said first gear drive, said second gear drive including a first gear wheel coupled to one of said pair of gear wheels, and a second gear wheel coupled to said first gear wheel, a crank shaft fixed to said second gear wheel, a pair of connecting rods rotatably secured to crank portions of said crank shaft and connected to said rocker arms, and means pivotally secured to said rocker arms for threadingly engaging said connecting rods to vary the stroke of said rocker arms.

4. In metal shears as defined in claim 2 wherein said first and second gear means are adjusted to provide a full number transmission ratio between the speed of rotation of said knife drums and of said crank shaft.

References Cited in the file of this patent

UNITED STATES PATENTS

| | | |
|---|---|---|
| 1,973,515 | Talbot | Sept. 11, 1934 |
| 2,180,203 | Hallden | Nov. 14, 1939 |
| 2,878,869 | O'Brien | Mar. 24, 1959 |

FOREIGN PATENTS

| | | |
|---|---|---|
| 604,679 | Germany | Oct. 25, 1934 |
| 627,356 | Germany | Mar. 13, 1936 |
| 510,848 | Great Britain | Aug. 9, 1939 |